United States Patent Office 2,871,777
Patented Feb. 3, 1959

2,871,777

PHOTOGRAPHIC APPARATUS INCLUDING FLUID-SPREADING AND SHEET-ARRESTING MECHANISM

John W. Lothrop, Westwood, and Charles O. Rolando, Lexington, Mass., assignors to Polaroid Corporation, Cambridge, Mass., a corporation of Delaware Application October 27, 1955, Serial No. 543,086

12 Claims. (Cl. 95—89)

This invention relates to photographic apparatus wherein photographic sheet materials are advanced, and particularly to mechanism for distributing a liquid between two photographic sheets and arresting the advancement of said sheets.

Heretofore, photographic apparatus such as cameras for processing photographic sheet material, and particularly cameras of the manually operated type now well known in the art, have included means, such as a pair of pressure-applying rolls between which a pair of sheets are advanced, for distributing a liquid between the sheets together with a separate mechanism for predeterminedly controlling or arresting the movement of the sheets. In a preferred form of camera of this type the sheet materials are drawn through and from the camera manually and the arresting mechanism usually includes members adapted to engage alterations, such as perforations, in the surface of one of the sheets and means for disengaging the members from the sheet when it is desired to continue the movement thereof.

An object of the present invention is to provide, in photographic apparatus through which sheet materials are advanced, a novel device both for superposing a pair of sheets and distributing a liquid between said sheets, and for arresting the movement of said sheets.

Another object of the invention is to provide a device of the above type for use with a pair of superposed sheets having successive enlarged sections of predeterminedly greater thickness than the remaining, substantially uniformly thick sections and comprising a pair of juxtaposed rolls defining a gap of sufficient width to permit the movement of sections of said sheets therethrough for distributing a liquid between said sheets, but of insufficient width to allow the passage of the thicker or enlarged sections of said sheets and thereby arrest the movement of said sheets.

A further object of the invention is to provide a device of the above type including manually operable means for so rotating said rolls, following the arrestment of said sheets, as to spread said rolls apart for trapping excess quantities of said liquid between said sheets and to advance an enlarged section thereof between said rolls, thereby permitting the continued advancement of said sheets between said rolls until the next successive enlarged section is engaged by said rolls to arrest the movement of said sheets.

Still another object of the invention is to provide, in a device of the above type, one roll having radially extending members adapted, during rotary movement of said rolls, to engage an enlarged section of said sheets for spacing said rolls apart and advancing said enlarged section therebetween.

Still a further object of the invention is to provide a device of the above type which is of a simple and inexpensive construction and is positive in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is a sectional view of the rolls of the mechanism of Fig. 3 shown in one position to illustrate the operation of the mechanism; and Fig. 6 is a view, similar to Fig. 5, with the rolls located in a spaced-apart position.

The mechanism of the present invention is particularly suitable for embodiment in photographic apparatus, such as a camera, wherein two elongated sheets of photographic material, one of which is photosensitive, are individually mounted and housed and are manually advanced from separate positions into superposed relation. The photosensitive sheet is moved through the camera intermittently to successive positions at which its movement is arrested, for example from a supply means to an exposure position and thence into superposition with the other sheet in a processing position which may be exterior of the camera, or to a processing position within the camera and finally to a position, for example exterior of the camera, where access thereto may be had. The two sheets, during superposition and advancement into processing position, are moved between a pair of pressure-applying members for distributing between the sheets a processing fluid preferably releasably carried by one of the sheets. The present invention comprehends a single, simple mechanism for both distributing a processing fluid between a pair of superposed sheets and for arresting the movement of said sheets following advancement of a predetermined length thereof through the apparatus.

Figure 1:
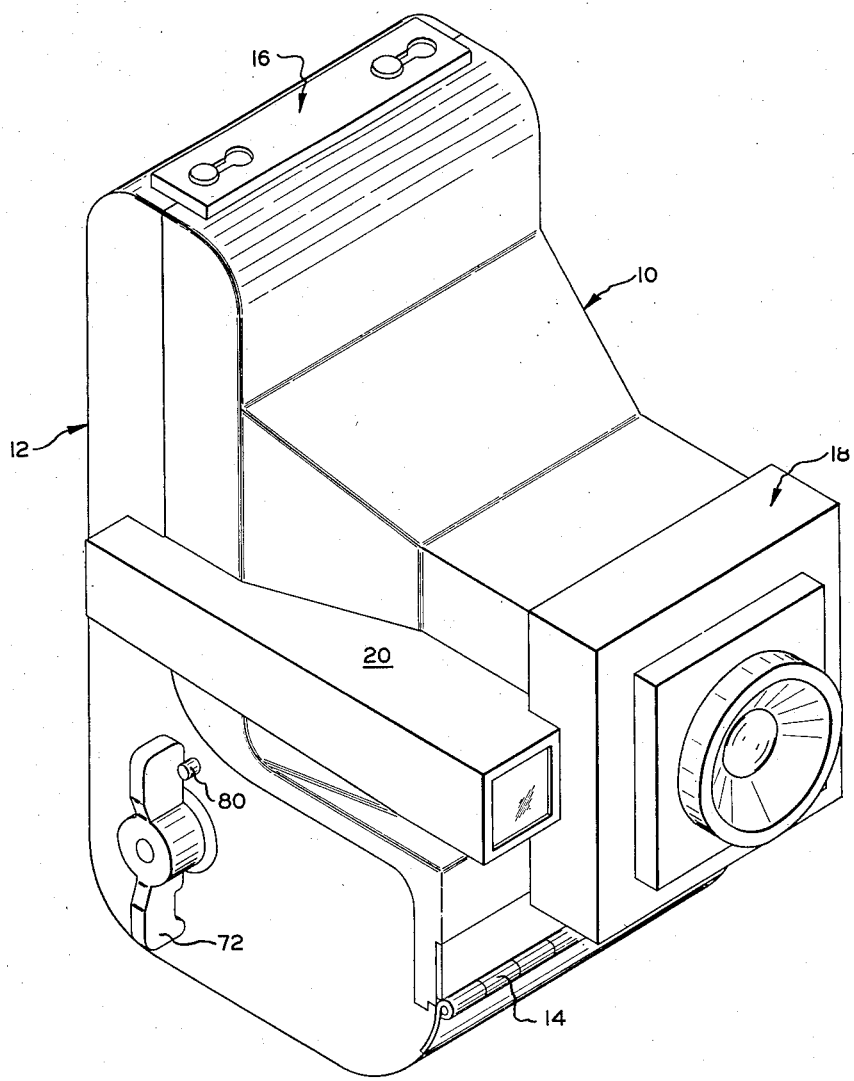
Figure 1 is a perspective view of a typical camera embodying the mechanism of the present invention.
Figure 2:
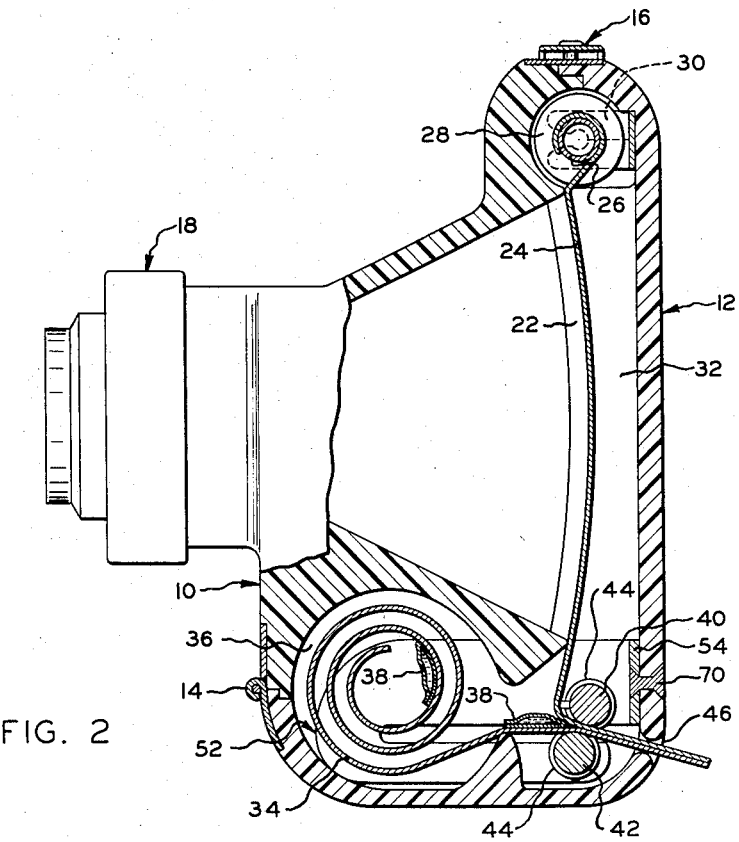
Fig. 2 is an elevational view of the camera of Fig. 1 shown partially in section taken substantially midway between the sides.
Figure 3:
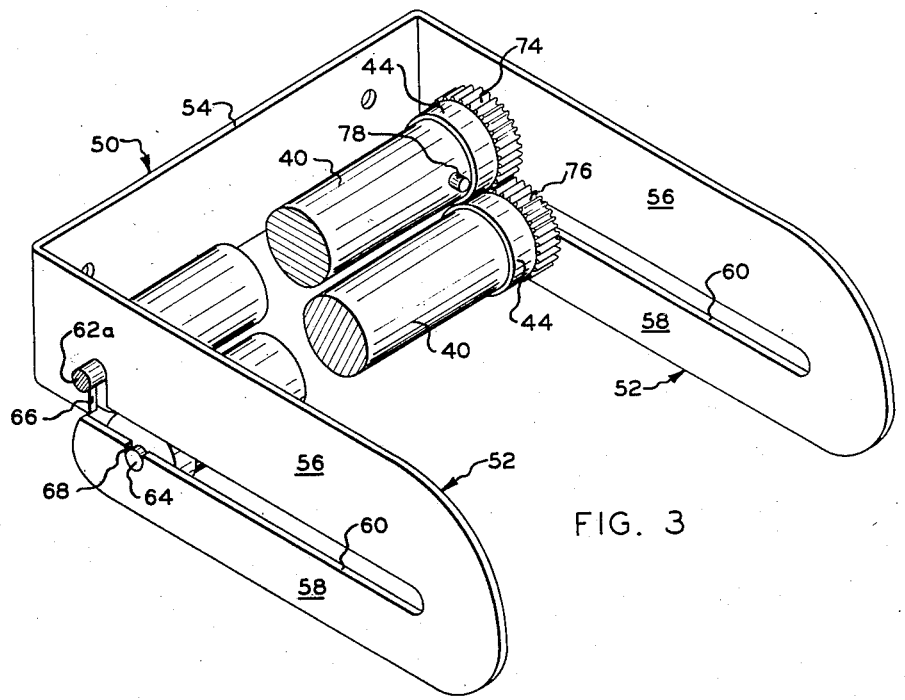
Fig. 3 is a perspective view of the mechanism of the invention.
Figure 4:
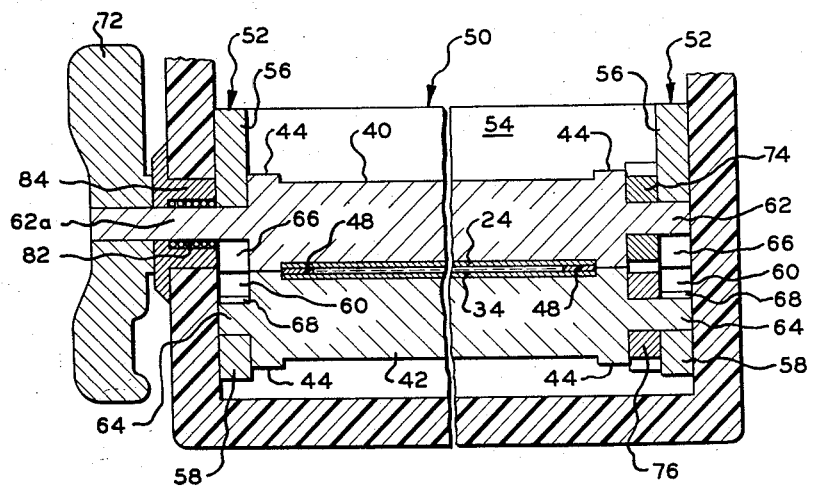
Fig. 4 is a view in section showing the mechanism of Fig. 3 together with a pair of superposed photographic sheets.

Reference is now made to Figs. 1 and 2 of the drawings wherein there is illustrated one form of camera incorporating the mechanism of the invention and showing the general relation of the components of the camera to the sheet materials employed therein. The camera comprises a forward casing section 10 and a rear casing section 12 pivotally mounted with respect to one another by a hinge 14 and with a latch 16 being provided at the end of the camera opposite the hinge for holding the two casing sections in closed position. Pivotal mounting of the two casing sections permits ready access therewithin for loading and threading the sheet materials used in the camera. The camera includes a lens and shutter assembly 18 of conventional design mounted on a tapered portion of forward casing section 10 and a view finder 20 mounted on the exterior of the forward casing section. Section 10 may comprise, instead of the rigid construction shown, a forward reentrant section including an exposure aperture on which is mounted a bellows, in turn mounting the lens and shutter assemblage. A pair of guide tracks 22 is provided at the rear of casing section 10 located on opposite sides of an exposure aperture for positioning frames of a photosensitive sheet for exposure.

A supply of photosensitive sheet material 24 is shown coiled on a conventional spool 26 mounted within a generally cylindrical chamber 28 formed by casing sections 10 and 12 and located at one end of said sections adjacent latch 16. Spool 26 includes a pair of stub shafts at opposite ends pivotally mounted in a U-shaped bracket 30 secured to rear casing section 12. Photosensitive sheet 24 is threaded from chamber 28 across guide tracks 22 where it is supported in position for exposure. Shoulders 32 are provided on the side walls of rear casing section 12 for holding sheet 24 against guide track 22 when the two casing sections are in closed position.

A supply of a second sheet 34 is provided in a preferably loose roll housed in a generally cylindrical chamber 36 formed by portions of casing sections 10 and 12 in the vicinity of hinge 14 at the end of the camera casing opposite chamber 28. The second sheet is adapted to be superposed with the exposed photosensitive sheet and the superposed sheets advanced between a pair of pressure-applying members for spreading a processing fluid in a thin layer between the sheets to form a sandwich. The photosensitive sheet includes a layer of photosensitive material, preferably an emulsion of a heavy metal salt such as a silver halide, in which a latent image may be attained by differential exposure to actinic light, and the second sheet is preferably adapted to serve as, or to support, an image-receptive layer in which a visible print of a latent image in the photosensitive layer may be produced. The processing composition, when spread in a uniformly thin layer between the photosensitive and second sheets, preferably effectuates a silver halide diffusion transfer-reversal process by which a latent image in the photosensitive sheet is developed and a positive print is produced within the sandwich preferably in or on the second sheet. Examples of the photographic materials useful in processes of the foregoing type are described in detail in Patent No. 2,543,181, issued to Edwin H. Land on February 27, 1951.

The processing fluid is carried, for example, in a succession of elongated rupturable containers 38 secured transversely and at regular intervals preferably to second sheet 34, one container being associated with an image-receiving area of the sheet. Each container 38 may comprise, for example, a rectangular section of sheet material, preferably of a multi-ply material, which is impervious to the processing fluid and vapor, folded longitudinally upon itself to form two walls which are bonded together at their margins to form a cavity. Containers of this type are more fully described in the aforementioned Land patent as well as in Patents Nos. 2,634,886, isued April 14, 1953, and 2,653,732, issued September 29, 1953, both in the name of Edwin H. Land, and in Patent No. 2,674,532, issued April 6, 1954, to Norton T. Pierce. It is apparent that this container construction results in an increase in the thickness of the sheet materials in the region of the container over the thickness of the sheets in the regions between successive containers, and it is this variation in the thickness of the materials, which must pass between the pressure-applying members, which is utilized for arresting the movement of the sheets.

It is desirable to provide, in each container, processing liquid in excess of the amount required for a layer of predetermined area and thickness and for this reason means are usually provided for trapping the excess liquid so that it is not spread beyond the desired area. This may be accomplished by providing a pair of spacing members adjacent the margins of the sheets located adjacent the end of the area over which the fluid is to be spread for spacing the sheets (and pressure members) apart to provide a space in which the excess liquid may collect. These spacing members may take the form of extensions on the containers and are described in the aforementioned Patent No. 2,674,532, or may be separate members of predetermined thickness secured to one of the sheets; but in whatever form they take, the spacing members serve to add to the thickness of the sheet materials to be moved between the pressure-applying members and are utilized for arresting the movement of the sheets.

Referring now to Figs. 2 through 6, there is illustrated the mechanism of the invention for spreading a fluid in a layer between the photosensitive and second sheets and for arresting the movement of the sheets. The mechanism includes a pair of elongated cylindrical rolls 40 and 42 mounted adjacent one another, with their axes parallel, within the rear casing section at the end of the casing opposite chamber 28. Either or both rolls 40 and 42 are provided at their ends with shoulders 44 for predeterminedly spacing apart the intermediate sections of the rolls to form a narrow elongated slot or gap between the rolls through which the superposed sheets are moved for spreading the processing liquid. The rolls are resiliently urged toward one another with a force sufficient to prevent their separation under ordinary conditions, for example, due to hydraulic pressure generated in the fluid between the sheets, and for all practical purposes the width of the gap or slot between the rolls is essentially fixed. The width of this slot is greater than the combined thickness of sheets 24 and 34 so that the thickness of the layer of liquid spread between the sheets, a function of the width of the gap, is subject to accurate control.

In the form of camera illustrated in the drawings, the processing fluid is spread between the superposed sheets to form a sandwich during movement of the sheets through the gap between the rolls. The sandwich thus formed is advanced directly from between the rolls to the exterior of the casing through a slot 46 provided in rear section 12 adjacent the rolls. To prevent premature exposure of the photosensitive layer of sheet 24, sheets 24 and 34 are preferably opaque to actinic light and the processing fluid may include a dye or opaque material for preventing light from leaking between the sheets. One of the sheets may also include, in the form shown, strips 48 along its margins, and substantially equal in thickness to the layer of fluid, for preventing the fluid from escaping between the margins of the sheets during spreading of the fluid.

Rolls 40 and 42 and the means for mounting the rolls comprise a single unit secured within the camera to rear casing section 12. This unit, shown in Fig. 3, comprises a generally U-shaped frame 50 having two legs 52 and a connecting transverse section 54. Each of legs 52 comprises two arms 56 and 58 joined together at the free end of the leg and separated by an elongated slot 60 extending longitudinally of the leg. Arm 56, joined at one end to base section 54, is substantially more rigid and wider than arm 58, the latter being free at its end adjacent base section 54 and comprising a cantilever spring for urging the rolls toward one another. Rolls 40 and 42 are provided with stub shafts 62 and 64, respectively, at their ends. Roll 40 is pivotally mounted between arms 56 with stub shafts 62 being journaled in slots 66 in arms 56 located adjacent base section 54. Roll 42 is pivotally mounted in juxtaposition with roll 40 with stub shafts 64 being journaled in slots 68 formed in arms 58 adjacent their free ends. Frame 50 is secured to rear casing section 12 at transverse section 54 by rivets 70 and with legs 52 of frame 50 extending on opposite sides of chamber 36.

The two sheets, 24 and 34, are preferably supplied with their leading ends joined to a leader so that the camera can be loaded, when the rear section is in open position, by mounting a spool 26 of sheet 24 in bracket 30, positioning a roll of sheet 34 in chamber 36 between legs 52, and threading the latter through the gap between rolls 40 and 42. All the materials are thus mounted on rear casing section 12 and when the two sections have been pivoted into closed position, the camera is ready for use.

The slot or gap between rolls 40 and 42 is too narrow to permit the passage of the sheets in the region of a container or spacing member so that as the sheets are manually drawn between the rolls, their movement is arrested as a container or spacing member starts to enter the gap and jams. The sheets may be precut or predeterminedly weakened in the area just ahead of each container or spacing member so that as the container or spacing member jams between the rolls, and movement of the sheets is arrested, the sheets tear transversely along a predetermined line. In this way, a sandwich of predetermined length and containing a single photographic print may be withdrawn from the camera and severed from the remaining portions of the sheets within the camera. Containers 38 are so positioned on sheet 34 that when each container jams between the rolls a frame of sheet 24 is in position for exposure on guide tracks 22.

Following arrestment of movement of the sheet materials by jamming of a container or spacing member between the rolls and severance of a sandwich along a line adjacent the rolls from the remaining portions of the sheets, it is necessary to reset the rolls so that the sheets may again be drawn between the rolls for spreading the fluid contents of the container. During resetting of the rolls, a container is advanced into a position between the rolls so that its fluid contents may be discharged between the sheets and the sheets are advanced so as to provide a leader which may be manually grasped by the operator for withdrawing a sandwich from the camera. The rolls are reset by rotating them in the direction calculated to advance the sheets and for this purpose a manually operable crank 72 is provided on the exterior of the camera casing and is coupled with a shaft designated at 62a on one end of roll 40. So that rolls 40 and 42 can be rotated together, they are coupled by meshed gears 74 and 76 mounted, respectively, on stub shafts 62 and 64.

At least one of the rolls includes a pair of relatively short radial projections adjacent its ends, for example, roll 40, in the form shown, includes a pair of short projections or pins 78 extending radially outward from its cylindrical surface adjacent shoulders 44. Instead of the pins shown, either or both rolls may include raised knurled sections, sprockets, or the like adapted to aid in resetting the rolls following arrestment of movement of the sheets.

Rolls 40 and 42 are normally positioned (as shown in Fig. 5) with pins 78 located adjacent, but not in contact with, the sheets as they enter the bite of the rolls. To hold the rolls in this position and prevent their pivotal movement during advancement of the sheet materials therebetween, a push button 80 is provided on the exterior of the camera casing in the path of pivotal movement of crank 72 and prevents turning of the crank past a predetermined position. Button 80 may be depressed manually so that the crank can be rotated for resetting the rolls, and then returns to its original position allowing only one revolution of the crank. Backlash or pivotal movement of the rolls in the other direction is prevented by any suitable means such as a spring 82 coiled around shaft 62a and secured within a sleeve 84 in the casing wall so as to permit free pivotal movement of shaft 62a in one direction (clockwise viewing Fig. 3) but bind on the shaft and prevent movement of the shaft in the opposite direction.

As rolls 40 and 42 are rotated during resetting, pins 78 move into engagement with sheet 24 in the region of a container or spacing member and advance the container or spacing member between the rolls while forcing roll 42 apart from roll 40 (as shown in Fig. 6). As pivotal movement of the rolls is continued, the pins pass from between the rolls, allowing the rolls to come together with a container located therebetween. Rotation of the rolls is continued either by turning crank 72 or by manually drawing on the sheets until the container has passed completely between the rolls and its liquid contents have been distributed between the sheets. The relationship between the diameter of the rolls and the dimensions of the containers and spacing members is such that one complete revolution of the crank and rolls is sufficient to advance a container between the rolls, discharge the fluid contents of the container between the sheets, and provide a leader for drawing a sandwich through the gap between the rolls. Following the single revolution of the rolls, they re-assume their substantially fixed setting for spreading the processing liquid in a uniform layer between the sheets.

In using the camera following loading and threading of a leader connected to the two sheets between the rolls, the operator grasps the leader and draws it from the camera until movement of the sheets is arrested by jamming of the first container or spacing member between the rolls. This positions the first frame of the photosensitive sheet 24 for exposure and, following exposure, when it is desired to process the sheets, the operator depresses button 80, turn crank 72 through one complete revolution, and draws a sandwich from the camera until movement of the sheets is again arrested and the sandwich containing a photographic print is torn from the remaining sections of the sheets within the camera. The next successive frame is then in position for exposure and the sandwich, comprising a frame of sheet 24 and an area of sheet 34 containing a photographic print with a layer of processing fluid between the sheets, may be maintained in superposition with a layer of processing fluid therebetween during a predetermined processing period, at the end of which the two sheets may be stripped apart.

While the liquid-spreading and sheet arresting mechanism has been shown in a particular type of camera from which the sheets are adapted to be withdrawn during processing, it is to be understood that such showing is intended for the purposes of illustration and that the mechanism may be readily incorporated, either with or without modification, into any type of photographic apparatus or camera and, for example, may be incorporated into a camera of the type disclosed in Patent No. 2,455,111, granted to Joseph F. Carbone et al. on November 30, 1948.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus wherein photographic sheet materials are advanced and within which said sheet materials are processed, means for distributing a photographic fluid between a pair of superposed sheets and for arresting the movement of said sheets, said means comprising a pair of rolls, means pivotally mounting said rolls in juxtaposition with their axes substantially parallel, means resiliently urging said rolls toward one another and into engagement with said sheets positioned between said rolls, means spacing said rolls apart to provide a gap of predetermined minimum width through which said sheets are movable for spreading said fluid in a layer therebetween, said gap between said rolls being of a width insufficient to allow the movement between said rolls of a section of said sheets of increased thickness through said gap whereby movement of said sheets is arrested, means for preventing the rotation of said rolls in a first direction, releasable means for preventing rotation of said rolls in a second direction intended to advance said sheets during advancement of said sheets between said rolls, manually operable means for rotating said rolls in said second direction, and means mounted on one of said rolls for simultaneously spacing said rolls apart and engaging said sheets for advancing said section of said sheets between said rolls in response to rotation of said rolls in said second direction.

2. In photographic apparatus wherein photographic sheet materials are advanced and within which said sheet materials are processed, means for distributing a liquid between a pair of superposed sheets and for arresting the movement of said sheets, said means comprising a pair of rolls, means pivotally mounting said rolls in juxtaposition with their axes substantially parallel, means resiliently urging said rolls toward one another and into engagement with said sheets positioned between said rolls, means spacing said rolls apart to provide a gap of predetermined minimum width through which said superposed sheets are movable for distributing a liquid between said sheets, means for preventing the rotation of said rolls in response to advancement of said sheets between said rolls in frictional engagement therewith, the last-named means including means releasable to permit the rotation of said rolls in a direction intended to advance said sheets, means for manually rotating said rolls in said direction to advance said sheets, and radial projections on one of said rolls adapted during rotation of said rolls to engage said sheets for separating said rolls and advancing between said rolls a section of said sheets in engagement with said projections.

3. A photographic device for spreading a liquid between a pair of sheets, including enlarged sections of predeterminedly greater thickness than the remaining substantially uniform sections thereof, and for arresting the movement of said sheets, said devcie comprising, in combination, a pair of rolls, means mounting one of said rolls for pivotal movement about its axis, means pivotally mounting the other of said rolls in juxtaposition with said one roll and for movement toward and away from said one roll, means resiliently urging said other roll toward said one roll, means spacing said rolls apart sufficiently to provide a gap of predetermined minimum width between said rolls permitting the movement of a uniformly thick section of said sheets between said rolls but of insufficient width to allow the passage of one of said enlarged sections of said sheets, means normally preventing the rotation of said rolls in any direction in response to movement of said sheets between said rolls in frictional engagement therewith, the last-named means including means releasable to permit the rotation of said rolls through substantially one revolution in a direction intended to advance said sheets, manually operable means for rotating said rolls in the last-named direction, and radial projections on at least one of said rolls normally positioned out of engagement with said sheets and adapted to engage said sheets during rotation of said rolls for spacing said rolls apart and advancing said enlarged section of said sheets between said rolls.

4. In photographic apparatus within which a pair of photographic sheets are advanced and are processed by a liquid carried by one of said sheets, means for superposing said sheets and spreading said liquid in a layer therebetween and for arresting the movement of said sheets in response to a variation in the thickness of said sheets in certain areas thereof, said means comprising a pair of rolls, means pivotally mounting said rolls in juxtaposition with their axes parallel, means resiliently urging said rolls toward one another, means associated with said rolls for spacing them apart to provide a gap of a width through which said superposed sheets are movable for spreading said liquid in a layer between the sheets, manually operable means for rotating said rolls in a direction intended to advance said sheets, and means normally preventing the rotation of said rolls in any direction and including means capable of being manually set to permit the manual rotation of said rolls through substantially one revolution in the above-mentioned direction, said gap being of a width normally sufficient to permit the movement of said sheets between said rolls but insufficient to permit the movement of a section of said sheets which is of a greater thickness whereby movement of said sheets is arrested as said section of greater thickness jams as it enters the gap between said rolls, at least one of said rolls including surface projections normally positioned out of engagement with said sheets and adapted, during rotation of said rolls, to engage said sheets for spacing said rolls apart and advancing the above-mentioned section of greater thickness between said rolls.

5. A photographic device for spreading, between a pair of superposed sheets, a photographic fluid carried in a container located between said sheets and for arresting the movement of said sheets, said device comprising, in combination, a pair of cylindrical rolls, means mounting said rolls for rotary movement about substantially parallel axes, one of said rolls being mounted for movement toward and away from the other of said rolls, spring means resiliently urging said one roll toward said other roll, means spacing said rolls apart to provide a gap of predetermined width through which said sheets are movable for spreading said fluid in a layer therebetween, said gap between said rolls being of a width insufficient to allow the movement of a container through said gap between said rolls whereby movement of said sheets between said rolls is arrested, means preventing the rotary movemnet of said rolls in a first direction, means for releasably retaining said rolls against rotary movement in a second direction intended to advance said sheets during advancement of said sheets through said gap between said rolls, the last-named means being releasable to permit the rotary movement of said rolls through substantially one revolution in said second direction, manually operable means for rotating said rolls and means mounted on one of said rolls for spacing said rolls apart and engaging said sheets so as to advance said sheets and said container between said rolls in response to rotation of said rolls in said second direction.

6. A photographic device for spreading, between a pair of superposed sheets, a photographic fluid carried in a container located between said sheets and for arresting the movement of said sheets, said device comprising, in combination, a pair of cylindrical rolls, means mounting said rolls for rotary movement about substantially parallel axes, one of said rolls being mounted for movement toward and away from the other of said rolls, spring means resiliently urging said one roll toward said other roll, means spacing said rolls apart to provide a gap of predetermined width through which said sheets are movable for spreading said fluid in a layer therebetween, said gap between said rolls being of a width insufficient to allow the movement of a container between said rolls whereby movement of said sheets is arrested, means preventing the rotary movement of said rolls in either direction, the last-named means including means releasable to permit the rotation of said rolls through substantially one revolution in a direction intended to advance said sheets following their arrestment, at least one of said rolls including projections on its cylindrical surface for engaging said sheets in the region of said container during rotary movement of said rolls for spacing said rolls apart and advancing said container between said rolls to cause the discharge of the fluid contents of said container between said sheets, and manually engageable means for rotating said rolls.

7. A photographic device for distributing a fluid between a pair of superposed sheets, at least one of which includes spacing elements located between the sheets for separating said sheets, and for arresting the movement of said sheets, said device comprising, in combination, a pair of elongated cylindrical rolls, means mounting said rolls for rotary movement with their axes in substantially a plane, one of said rolls being mounted for movement in said plane toward and away from the other of said rolls, spring means resiliently urging said one roll toward said other roll, means spacing said rolls apart to provide a gap of predetermined width through which said sheets are movable for spreading said fluid in a layer therebetween, said gap between said rolls being of a width insufficient to allow the movement of a section of said sheets in the region of said spacing elements between said rolls whereby movement of said sheets is arrested, means preventing the rotary movement of said rolls in either direction, the last-named means including means releasable to permit the movement of said rolls through substantially one revolution in a direction intended to advance said sheets following their arrestment, at least one of said rolls including projections on its cylindrical surface for engaging said section of said sheets to space said rolls apart and advance said section between said rolls, and manually engageable means for rotating said rolls.

8. In photographic apparatus wherein photographic sheet materials are advanced and within which said sheet materials are processed, means for distributing a photographic fluid between a pair of superposed sheets and for arresting the movement of said sheets, said means comprising a pair of elongated cylindrical rolls, means pivotally mounting one of said rolls at its ends for rotary movement, means mounting the other of said rolls at its ends for rotary movement in juxtaposition with said one roll, said other roll being movable toward and away from said one roll, spring means resiliently urging said other roll toward said one roll, at least one of said rolls having shoulders at its ends for spacing said rolls apart to provide a gap of predetermined width through which said sheets are movable while said rolls remain stationary for spreading said fluid in a layer between said sheets, said gap between said rolls being of a width insufficient to allow the movement between said rolls of a section of said sheets of increased thickness whereby movement of said sheets through said gap between said rolls is arrested, means for preventing the rotation of said rolls in a first direction, releasable means for preventing the rotation of said rolls in a second direction intended to advance said sheets during advancement of said sheets between said rolls, manually operable means for rotating said rolls, and means mounted on one of said rolls for spacing said rolls apart and engaging and for advancing said section of said sheets between said rolls in response to rotation of said rolls in said second direction.

9. In photographic apparatus wherein photographic sheet materials are advanced and within which said sheet materials are processed, means for distributing a fluid between a pair of superposed sheets and for arresting the movement of said sheets, said means comprising a pair of elongated cylindrical rolls, means pivotally mounting said rolls in juxtaposition with their axes substantially parallel, one of said rolls being mounted for movement toward and away from the other of said rolls, means resiliently urging said one roll toward said other roll, means spacing said rolls apart to provide a gap of predetermined width through which said superposed sheets are movable for distributing a fluid between said sheets, means for preventing the rotation of said rolls in any direction, the last-named means including means releasable to permit the rotation of said rolls in a direction intended to advance said sheets, means for manually rotating said rolls through substantially one revolution in the last-named direction, and a pair of members projecting radially from the surface of said other roll adjacent its ends, said projecting members being adapted during rotation of said rolls to engage said sheets at their margins for advancing a section of said sheets between said rolls while urging said one roll apart from said other roll.

10. In photographic apparatus wherein photographic sheet materials are advanced and within which said sheet materials are processed, means for distributing a photographic fluid between a pair of superposed sheets and for arresting the movement of said sheets, said means comprising a pair of elongated cylindrical rolls, means pivotally mounting said rolls in juxtaposition with their axes substantially parallel, one of said rolls being mounted for movement toward and away from the other of said rolls, means resiliently urging said one roll toward said other roll, means spacing said rolls apart to provide a gap of predetermined width through which said sheets are movable for spreading said fluid in a layer therebetween, said gap between said rolls being of a width insufficient to allow the movement between said rolls of a section of said sheets of increased thickness whereby movement of said sheets is arrested, means for preventing the rotation of said rolls in either direction, the last-named means including means releasable to permit the rotation of said rolls in a direction intended to advance the sheets following their arrestment, manually operable means for rotating said rolls in the last-named direction, and a pair of members projecting radially from said other roll adjacent its ends, said projecting members being adapted during rotation of said rolls to engage said sheets at their margins for advancing said section of said sheets between said rolls while forcing said one roll apart from said other roll.

11. A photographic device for spreading a fluid between a pair of sheets, including enlarged sections of predeterminedly greater thickness than the remaining substantially uniform sections thereof, and for arresting the movement of said sheets, said device comprising, in combination, a pair of elongated cylindrical rolls, means mounting one of said rolls for pivotal movement about its axis, means pivotally mounting the other of said rolls in juxtaposition with said one roll and for movement toward and away from said one roll, means resiliently urging said other roll toward said one roll, at least one of said rolls having shoulders at its ends for spacing said rolls apart sufficiently to provide a gap between said rolls which will permit the movement of one of said uniformly thick sections of said sheets between said rolls but is insufficient to allow the passage of one of said enlarged sections of said sheets, a pair of meshed gears secured to the ends of said rolls for coupling said rolls and insuring their movement together, means normally preventing the rotation of said rolls in any direction, said means including means releasable so as to permit the rotation of said rolls through substantially one revolution in a direction intended to advance said sheets, manually engageable means coupled with said one roll for rotating said rolls in the last-named direction, and radial projections on at least one of said rolls normally positioned out of engagement with said sheets and adapted to engage said sheets during rotation of said rolls for advancing said enlarged section of said sheets between said rolls while spacing said other roll apart from said one roll.

12. A photographic device for spreading, between a pair of superposed sheets, a photographic fluid carried in a container located between said sheets and for arresting the movement of said sheets, said device comprising, in combination, a pair of elongated cylindrical rolls, means mounting said rolls for rotary movement about substantially parallel axes, one of said rolls being mounted for movement toward and away from the other of said rolls, spring means resiliently urging said one roll toward said other roll, at least one of said rolls having shoulders at its ends for spacing said rolls apart to provide a gap of predetermined width through which said sheets are movable for spreading said fluid in a layer therebetween, said gap between said rolls being of a width insufficient to allow the movement of a section of said sheets in the region of a container between said rolls whereby movement of said sheets is arrested, a pair of meshed gears secured to the ends of said rolls for coupling said rolls and insuring their movement together, means preventing the rotary movement of said rolls in either direction, the last-named means including means releasable to permit the rotation of said rolls through substantially one revolution in a direction intended to advance said sheets following their arrestment, a pair of members projecting radially from the surface of said one roll adjacent its ends and adapted, during rotation of said rolls, to engage said sheets at their margins in the region of said container for advancing said container between said rolls to cause the discharge of the fluid contents of said container between said sheets and for urging said other roll apart from said one roll, and manually engageable means coupled with said one roll for rotating said rolls.

References Cited in the file of this patent

UNITED STATES PATENTS

| | | |
|---|---|---|
| 2,455,111 | Carbone et al. | Nov. 30, 1948 |
| 2,458,186 | Messina et al. | Jan. 4, 1949 |
| 2,644,755 | Wolff et al. | July 7, 1953 |